June 14, 1960     H. A. GENTILE     2,940,148
PARACHUTE RELEASE SHACKLE
Filed July 17, 1958
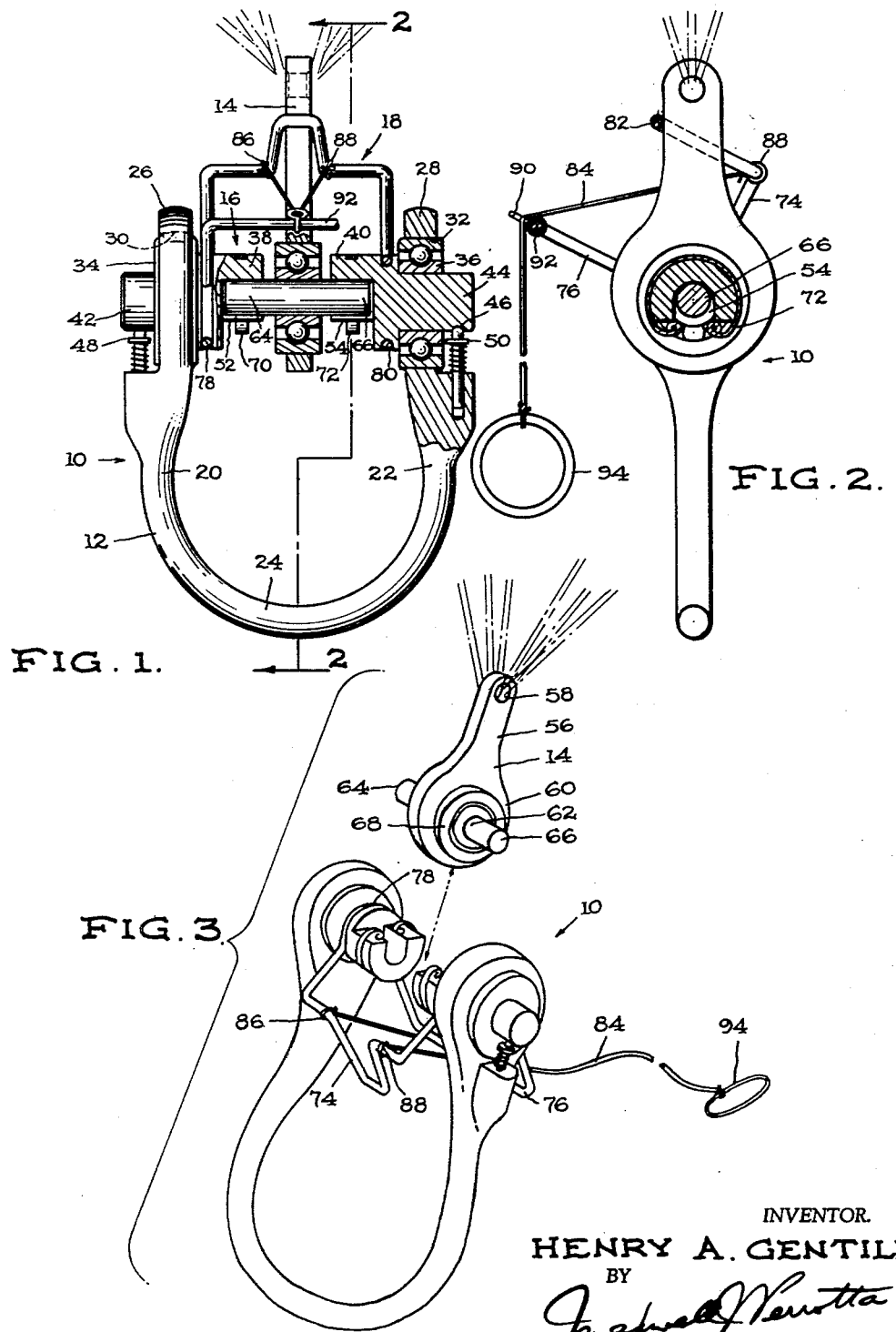
INVENTOR.
HENRY A. GENTILE
BY
*Maxwell Nerotta*
ATTORNEY

United States Patent Office 2,940,148
Patented June 14, 1960

2,940,148

PARACHUTE RELEASE SHACKLE

Henry A. Gentile, 236 Maple Ave., Barrington, R.I.

Filed July 17, 1958, Ser. No. 749,079

3 Claims. (Cl. 24—201)

The present invention relates to improvements in shackles and more particularly to a parachute release shackle.

Prior parachute harnesses have been dangerous to the life and limb of parachutists in that should the parachutist encounter high winds during a jump, it becomes almost impossible to collapse the parachute, in consequence of which the parachutist can be dragged by the parachute.

Accordingly, it is a primary object of the present invention to provide an improved shackle for use in parachute harnesses whereby upon encountering high winds or other conditions requiring release of the parachute, the parachutist can release the parachute.

A further object of the present invention is to provide an improved parachute shackle which effectively couples the parachute proper to the body-attaching harness and wherein upon predetermined operation of the shackle, the parachute can be released from the harness when so desired.

Still another object of the present invention is to provide an improved parachute release shackle embodying certain safety features which will prevent the accidental release of the parachute.

Other objects of the present invention are to provide a parachute release shackle of improved construction which is relatively simple in design, requiring few parts easily assembled together and wherein release operation can be accomplished with ease, although requiring positive action of the parachutist to effect release of the parachute.

Various other objects and advantages will become apparent from the detailed description to follow.

In the drawings:

Figure 1 is an elevational view of my improved parachute release shackle, parts being shown in section;

Figure 2 is a vertical sectional view taken substantially along the plane of line 2—2 in Figure 1;

Figure 3 is a perspective view of my improved shackle shown operated to its release position.

Referring more particularly to the drawings wherein like numerals apply to like parts throughout, it will be seen that I have provided an improved parachute release shackle 10 which is comprised of a first element 12, a second element 14, means interconnecting the first and second elements at 16 so as to connect a parachute with the body of a wearer, and operating means 18 whereby the interconnecting means 16 can be moved between two positions as will be described in greater detail hereinafter.

The first element 12 is a generally U-shaped element including a pair of legs 20 and 22 joined by a bight portion 24. The bight portion 24 is adapted to have a body attaching strap connected thereto, the strap being part of the harness for attaching a parachute to the body of the parachutist.

Each of the legs 20 and 22 of the first element 12 is formed with an enlarged bearing portion as at 26 and 28, formed with apertures at 30 and 32. A pair of bearings 34 and 36 are received in the openings 30 and 32, respectively, to rotatably support the interconnecting means 16 to be described in detail hereinafter.

The interconnecting means 16 is comprised of a pair of channelled members 38 and 40 which have bearing portions 42 and 44, respectively, extending therefrom so as to be rotatably received within the bearings 34 and 36, respectively. The bearing portions 42 and 44 are each formed with a detent recess as at 46 and each of the legs 20 and 22 has a spring pressed detent as at 48 and 50 carried thereby for normal engagement in the detent recess of the respective bearing portions 42 or 44.

Each of the channelled members 38 and 40 is formed with a channel as at 52 and 54 which are substantially aligned with each other for a purpose to be described. The detents 48 and 50 normally hold the channelled members 38 and 40 in the position shown in Figure 1 wherein the channels 52 and 54 face toward the bight portion 24 of the first element 12.

The second element 14 is a small finger-like element including a narrow portion 56 formed with an aperture at 58 adapted to have the parachute proper connected thereto, as by cords extending through the aperture 58. The element 14 includes an enlarged portion at 60 having a pin 62 extending therethrough so as to provide end portions at 64 and 66. A bearing at 68 rotatably supports the pin 62 within the enlarged portion 60 of the element 14, as best shown in Figure 1.

Figure 1 also shows that the end portions 64 and 66 of the pin 62 are received within the channels 52 and 54 of the channelled members 38 and 40, respectively. A pair of spring retainers 70 and 72 are engaged on the channelled members 38 and 40, respectively, so as to normally resiliently retain the pin 62 within the channels, as above described. Figure 2 shows the manner in which the spring 72 acts to hold the pin portion 66 within the channel 54.

The channelled members 38 and 40 are interconnected by the operating means 18 as will now be described. The operating means 18 includes a pair of lever portions 74 and 76 which are generally angularly displaced from each other and receive the channelled members 38 and 40 at the juncture of the two lever portions 74 and 76 as shown at 78 and 80, see Figures 1 and 3. The portions 78 and 80 can be fixedly secured to the channelled members 38 and 40 by weld or other suitable means so that upon pivoting of the lever portions 74 and 76, the channelled members 38 and 40 are simultaneously rotated.

The upper lever portion 74 has an offset U-shaped portion at 82 which is adapted to engage the narrow portion 56 of the second element 14, as shown in Figure 2. This limits pivoting of the lever portions in a clockwise direction. An operating cord 84 is connected to the lever portion 74 at 86 and 88 and the cord 84 extends through an eyelet at 90 on the cross bar portion 92 of the lever portion 76 and terminates in a ring at 94.

From the foregoing it is believed that the construction and operation of my improved parachute release shackle will be obvious. The bight portion 24 of the first element 12 is connected to a strap which is attached to the body of the parachutist while the second element 14 has the parachute proper connected thereto in any suitable fashion. The first and second elements 12 and 14, respectively, are interconnected by engagement of the pin 62 in the channels 52 and 54, respectively, of the channelled members 38 and 40 which are normally held in the position shown in Figure 1 by the spring loaded detents 48 and 50. The spring retainers 70 and 72, of course, prevent the pin 62 from dropping out of the channels and the tension exerted on the first and second elements in use prevent the disengagement of the pin 62 from the channels 52 and 54.

When a parachutist has dropped to the ground and is encountering high winds or other conditions rendering it desirable to release the parachute, he simply pulls on the ring 94 of the cord 84 which causes downward pivoting of the lever portions 76 and 74. The angular relationship of the lever portions 76 and 74 insures sufficient leverage for good operation. Upon pivoting of the lever portions 74 and 76, the channelled members 38 and 40 are simultaneously rotated in their bearings so that the channels 52 and 54 are rotated to an upward position facing away from the bight portion 24. This is accomplished in opposition to the action of the detents 48 and 50, and the tension on the second element 14 is such as to pull the pin 62 from the channels by overcoming the action of the springs 70 and 72. The parachute is thus thereby released.

Of course, while one parachute release shackle is shown, it will be obvious that a pair can be utilized for connecting a parachute to the body of a parachutist. The pair would of course provide an added safety factor highly desirable in such items.

In view of the foregoing it is believed that I have provided an improved release shackle which fulfills the objects hereinbefore enumerated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

I claim:

1. A parachute release shackle comprising a first, generally U-shaped element having a pair of legs joined by a bight portion adapted to have a body-attaching strap connected thereto, each of said legs having a channelled member swivelly carried thereby, operating means joining said channelled members for joint swivel action and so that both members open out in the same direction, said means being movable from a first position in which said channelled members face toward said bight portion to a second position in which said channelled members face away from said bight portion, a second, finger element having means for connection to a parachute, a pin extending from opposite surfaces of said finger element and having end portions seated in the channels of said channelled members for interconnection when the latter are in their first position, means normally retaining said channelled members in said first position, said operating means including a pair of angularly spaced lever portions having said channelled members secured thereto at the juncture of the lever portions, and means connected with and extending over said lever portions for effecting rotation thereof and movement of said channelled members from said first position to said second position to release the parachute.

2. A parachute release shackle comprising a first, generally U-shaped element having a pair of legs joined by a bight portion adapted to have a body-attaching strap connected thereto, each of said legs having a channelled member swivelly carried thereby, means joining said channelled members for joint swivel action and so that both members open out in the same direction, said means being movable from a first position in which said channelled members face toward said bight portion to a second position in which said channelled members face away from said bight portion, a second, finger element having means for connection to a parachute, a pin extending from opposite surfaces of said finger element and having end portions seated in the channels of said channelled members for interconnection when the latter are in their first position, detent means normally retaining said channelled members in said first position, and spring retainer means holding said pin end portions from accidental displacement from the channels of said channelled members.

3. A parachute release shackle comprising a first, generally U-shaped element having a pair of legs joined by a bight portion adapted to have a body-attaching strap connected thereto, each of said legs having a channelled member swivelly carried thereby, operating means joining said channelled members for joint swivel action and so that both members open out in the same direction, said means being movable from a first position in which said channelled members face toward said bight portion to a second position in which said channelled members face away from said bight portion, a second, finger element having means for connection to a parachute, a pin extending from opposite surfaces of said finger element and having end portions seated in the channels of said channelled members for interconnection when the latter are in their first position, detent means normally retaining said channelled members in said first position, spring retainer means holding said pin end portions from accidental displacement from the channels of said channelled members, said operating means including a pair of angularly spaced lever portions having said channelled members secured thereto at the juncture of the lever portions, and means connected with and extending over said lever portions for effecting rotation thereof and movement of said channelled members from said first position to said second position to release the parachute.

References Cited in the file of this patent

UNITED STATES PATENTS

| | | |
|---|---|---|
| 311,104 | Colton | Jan. 20, 1885 |
| 449,235 | Rose et al. | Mar. 31, 1891 |
| 556,661 | Burress | Mar. 17, 1896 |
| 2,065,508 | Barnes | Dec. 29, 1936 |
| 2,522,790 | Johnston | Sept. 19, 1950 |